Nov. 13, 1962 R. H. BALDWIN 3,064,044
MULTISTAGE OXIDATION SYSTEM FOR PREPARING DICARBOXYLIC ACID
Filed Aug. 15, 1957
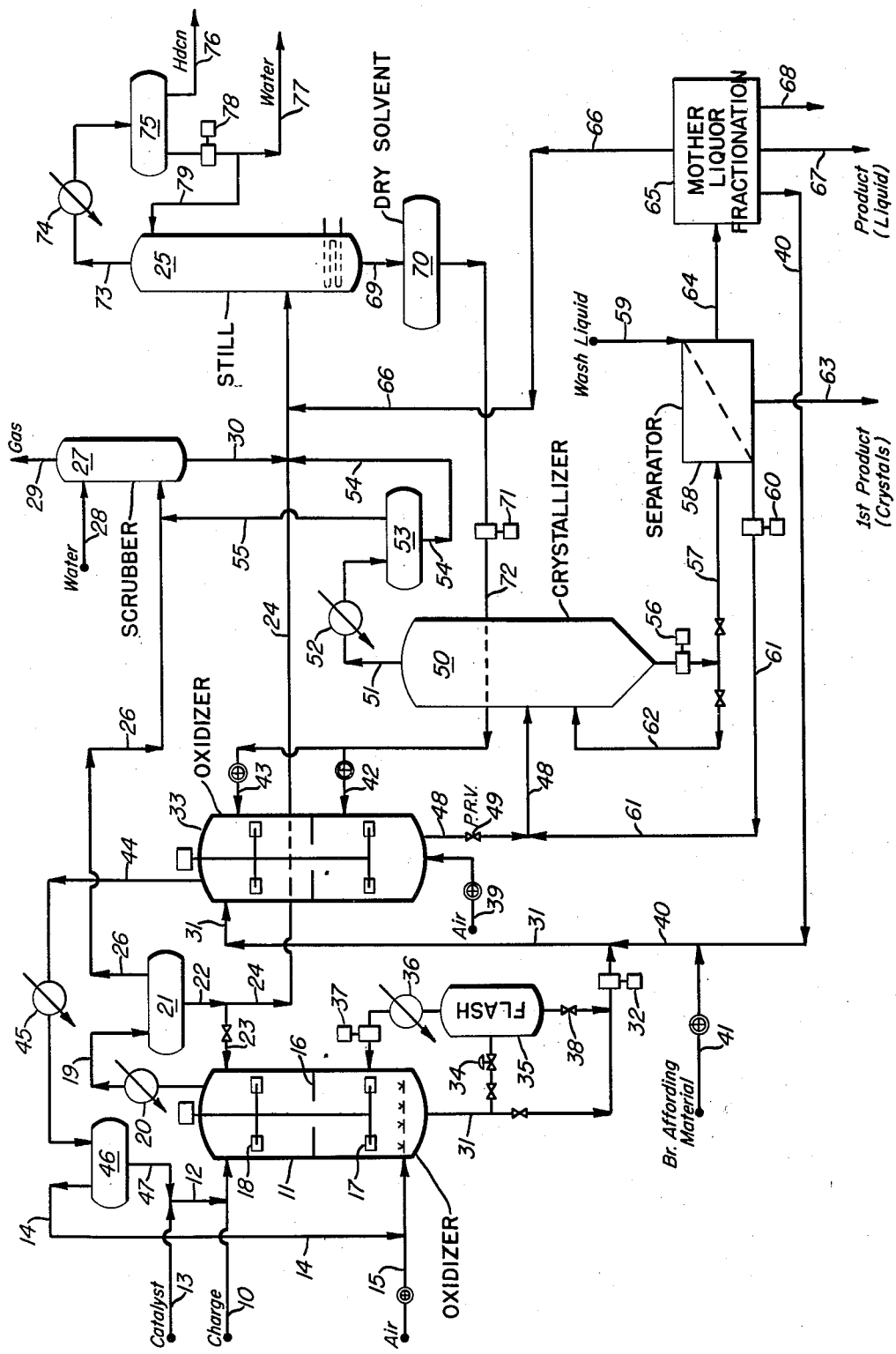

United States Patent Office 3,064,044
Patented Nov. 13, 1962

3,064,044
MULTISTAGE OXIDATION SYSTEM FOR PREPARING DICARBOXYLIC ACID
Richard H. Baldwin, Chicago, Ill., assignor to Standard Oil Company, Chicago, Ill., a corporation of Indiana
Filed Aug. 15, 1957, Ser. No. 678,298
4 Claims. (Cl. 260—524)

This invention relates to a multistage oxidation system for oxidizing an aromatic hydrocarbon having at least one, and preferably two or more, oxidizable substituents into a carboxylic acid product and it pertains more particularly to an improved technique for maintaining a final oxidation under substantially anhydrous conditions. The invention will be described as applied to the production of terephthalic acid from paraxylene.

An object of the invention is to provide improvements in commercial systems for obtaining maximum yields of high quality aromatic carboxylic acids by the oxidation of aromatic hydrocarbons having oxidizable substituents in the presence of known oxidizing catalysts wherein a bromine-affording substance is employed in at least the final oxidation stage which is operated at a pressure in the range of 50 to 500 p.s.i. at a temperature in the range of about 320 to 440° F. A further object is to provide an improved technique for handling solvent (preferably acetic acid) and for maintaining the solvent in the final oxidation zone under substantially anhydrous conditions. Other objects will be apparent as the detailed description of the invention proceeds.

In practicing the invention an aromatic hydrocarbon having at least one, and preferably two or more, oxidizable substituents such, for example, as substantially pure paraxylene is continuously oxidized with an oxygen-containing gas such as air in a stage-countercurrent oxidation system wherein the first stage is operated at about 50 to 400 p.s.i. at a temperature in the range of 300 to 400° F. for a period of .1 to 2 hours or more and the second stage is operated under a pressure of about 100 to 500 p.s.i. at a temperature in the range of about 320 to 440° F. for an average contacting period of about .2 to 2 hours, a solvent or reaction medium being employed in both stages. The solvent is preferably an aliphatic carboxylic acid having 2 to 6 carbon atoms per molecule and the preferred solvent is acetic acid. The amount of solvent should be at least about 1:1 on a volume basis in each stage based on charging stock and may be as high as 5:1 or more, the amount in any case being sufficient to give a readily transferable and pumpable slurry. Temperature control in each of the oxidation zones is preferably effected by removing vapors of aqueous solvent at a predetermined controlled pressure. By introducing large amounts of substantially anhydrous solvent into the final oxidizing zone, the water produced in said zone is largely removed in vapor form with solvent vapors so that the solvent concentration in this final stage can be maintained higher than 90 percent and preferably higher than 95 percent by weight. The aqueous solvent vapors removed from each of the zones is at least partially condensed and at least a part of the resulting condensate is introduced to the first stage oxidation zone in order to supply the required amount of solvent therein. Thus while some anhydrous solvent may be introduced to the first stage and some aqueous solvent condensate may be returned to the second stage, most of the second stage solvent is introduced thereto in substantially anhydrous form while in the first stage more solvent is introduced in condensed aqueous form than is introduced in anhydrous form.

If desired, the product from the first stage may be flashed to remove therefrom any unoxidized hydrocarbons and these unoxidized hydrocarbons may be returned to the first stage so that partially oxidized hydrocarbons are finally oxidized in the second stage.

The invention will be more clearly understood from the following detailed description of a specific example read in conjunction with the accompanying drawing which is a schematic flowsheet of a continuous oxidation and acid recovery system embodying the present invention.

The substituted aromatic which is to undergo oxidation, paraxylene in this example, is introduced through line 10 at a controlled temperature into reactor 11 along with aqueous solvent condensate from line 12, the solvent in this case being acetic acid. About 1 to 2 weight percent of manganese bromide based on fresh paraxylene is introduced via line 13, preferably with aqueous solvent introduced by line 12 although, if desired, the manganese may be added to the first stage in the form of manganese acetate and another bromine-affording substance such as ammonium bromide may be introduced directly into the second stage.

No novelty is claimed per se in the catalyst or in the catalyst promoter employed in this invention since the invention is an improvement in a particular promoted catalyst system recently perfected by others. The catalyst is a multi-valent or heavy metal, preferably in a form which is soluble in the reaction medium or solvent. The catalyst metal may advantageously be selected from the group consisting of manganese, cobalt, nickel, chromium, vanadium, molybdenum, tungsten, tin, cerium, or mixtures thereof, and the metal may be employed in elemental, combined, or ionic form—preferably in the form of acetate when the reaction medium or solvent is acetic acid. The promoter is a substance-affording bromine, the bromine being in elemental, ionic, organic or inorganic form. Thus the bromine may be employed in the form of potassium bromate, ammonium bromide, benzyl bromide, tetrabromoethane, manganese bromide or the like. The proportions of catalyst and promoter may be approximately stoichiometric as exemplified by manganese bromide and generally are in the range of 1:10 to 10:1 atoms of catalyst metal per atom or bromine. The amount of catalyst employed is usually in the range of about .01 to 10 percent or more and is preferably in the range of about .2 to 2 percent by weight based on aromatic hydrocarbon reactant charged. The preferred mixed metal catalysts are mixtures of manganese in the form of bromide or acetate with ammonium molybdate, ammonium chromate, tungstic acid, cobalt acetate, or the like, the proportions usually being about 1 to 2 parts by weight of the manganese salt per part by weight of the other metal compound. Alternatively, of course, the catalyst metals may be employed as salts of an acid which is being produced in the system.

The oxidizing gas introduced at the base of vessel 11 may be oxygen-containing gas from line 14 supplemented with a controlled amount of air introduced via line 15 to the base of vessel 11. This vessel is preferably provided with one or more baffles 16 for separating the vessel into separate stages and each stage of the vessel is provided with impeller mixers 17 and 18 which are rotated at such speed as to obtain intimate mixing and to prevent product solids or catalyst from settling out of the liquid phase. Vessel 11 is operated in this example at about 225 p.s.i. and at a temperature of about 375° F. with an average holding time of about 1 hour, vapors are removed through line 19 and cooled in condenser 20, the resulting condensate and uncondensed gas being introduced into receiver 21. Condensate which is largely aqueous solvent is withdrawn from the receiver by line 22 and that portion thereof which is not returned by line 23 to vessel 11 is introduced by line 24 to still 25. Uncondensed gas which leaves the top of receiver 21 through line 26 is scrubbed in vessel 27 with water from line 28 so that the gases ultimately vented through line 29 contain no acetic acid. Aqueous acetic acid from the base of scrubber 27 is returned by line 30 and line 24 to still 25.

The partially oxidized charge is withdrawn from vessel 11 by line 31 and it may be pumped directly by pump 32 to the second stage oxidizing vessel 33. However, it may be desirable to introduce into vessel 33 only partially oxidized hydrocarbon such as toluic acid, in which case the liquid from the base of vessel 11 may be introduced through pressure reducing valve 34 into flash chamber 35 from which vaporized hydrocarbons are returned through condenser 36 by pump 35 to vessel 11 and only the partially oxidized products are transferred by line 38 and pump 32 to second stage oxidizer 33. In either case, sufficient air is introduced at a controlled rate by line 39 at the base of vessel 33 to complete the oxidation of the paraxylene to terphthalic acid. In addition to partially oxidized material from vessel 11, recycled partially oxidized material, such as toluic acid, may be introduced to oxidizer 33 by line 40. If manganese acetate is employed as the sole catalyst in vessel 11, a bromine-affording material such as ammonium bromide is introduced through line 41 in an amount of the order of .1 to 1 weight percent based on charge.

Oxidizer 33 is maintained at a pressure of about 400 p.s.i., at a temperature of about 400° F., the temperature being controlled by adding substantially anhydrous acetic acid to the various stages through lines 42 and 43 and removing aqueous solvent vapors through line 44 and condenser 45 to receiver 46. The uncondensed gas leaving the top of receiver 46 should contain less than 8 percent oxygen but it may contain about 1 to 8 percent oxygen and hence it is introduced by lines 14 and 15 to supply oxygen in vessel 11. The amount of additional air introduced from line 15 should be controlled so that the oxygen content of gases in condenser 20 and receiver 21 will be less than 8 percent, preferably near zero. Condensate from receiver 46 is returned by line 47 to line 12 for introduction into vessel 11 although, if desired, a part of this condensate may be returned to vessel 33 and/or introduced by line 24 to still 25. By introducing substantially anhydrous acetic acid into oxidizer 33, the solvent in this vessel remains substantially anhydrous since the water formed by oxidation is largely removed with solvent vapors through line 44 and the solvent thus removed supplies most of the required solvent for vessel 11 as hereinabove described.

The product stream is withdrawn from the base of vessel 33 by line 48 and introduced by pump, reducing valve, or other transfer means 49 to crystallizer 50 which may be operated at any pressure in the range of atmospheric to 100 p.s.i. or more and in this example is operated at about 10 p.s.i.g. Solvent vapors are removed from the crystallizer by line 51 through condenser 52 and the condensate and vapors are thence introduced into receiver 53 from which condensate passes by line 54 to line 24 and still 25 while vapors pass by line 55 to line 26 and scrubber 27. A portion of the condensate may be recycled to crystallizer 50 to maintain a pumpable slurry. Slurry is removed from the base of the crystallizer by pump 56 and introduced by line 57 to separator 58 which may be a suitable filter or centrifuge system. Crystals separated in separator 58 may be washed with a wash liquid from line 59 (water or acetic acid), the wash liquid being returned by pump 60 and line 61 back to crystallizer 50. If wash is acetic acid, this may be sent to either oxidizer 11 or 33 for makeup if desired. During the wash cycle, slurry discharged by pump 56 may be returned to vessel 50 by line 62. Washed crystals of terephthalic acid are discharged from the system by line 63.

The mother liquor which is discharged from separator 58 by line 64 is separated in system 65, preferably by fractionation, into various components such as aqueous solvent which is discharged by line 66 to line 24 and still 25, a toluic acid fraction which is recycled by line 40 to oxidizer 33, a product fraction withdrawn through line 67 (which may be benzoic acid if the charge contains ethylbenzene) and a waste fraction withdrawn through line 68.

The aqueous solvent from all parts of the system is charged by line 24 to still 25 from which substantially anhydrous solvent is withdrawn through line 69 to storage tank 70 from which such solvent is returned by pump 71 and line 72 to supply the requirements of vessel 33. Water and azeotroped unreacted hydrocarbons are taken overhead through line 73 and condenser 74 to receiver 75 from which hydrocarbons may be withdrawn by line 76 and water through line 77, a part of the condensed water being returned by pump 78 and line 79 for use as reflux in still 25.

While the invention has been described as a system for producing terephthalic acid from paraxylene, it should be understood that the invention is applicable to the oxidation of any aromatic hydrocarbon having one or more, and preferably at least two, oxidizable substituents. Examples of oxidizable substituted aromatic hydrocarbons and of the acids obtained therefrom are as follows:

| | |
|---|---|
| Methylbenzene | Benzoic. |
| 1,2-dimethylbenzene | Phthalic. |
| 1,3-dimethylbenzene | Isophthalic. |
| 1,4-dimethylbenzene | Terephthalic. |
| 1,2,3-trimethylbenzene | Hemimellitic. |
| 1,2,4-trimethylbenzene | Trimellitic. |
| 1,3,5-trimethylbenzene | Trimesic. |
| 1,2,3,4-tetramethylbenzene | Prehnitic. |
| 1,2,4,5-tetramethylbenzene | Pyromellitic. |
| 1,2,3,5-tetramethylbenzene | Mellophanic. |
| Pentamethylbenzene | Benzenepentacarboxylic. |
| Hexamethylbenzene | Mellitic. |
| p-Diisopropylbenzene | Terephthalic. |
| m-Diisopropylbenzene | Isophthalic. |
| 1,3,5-triisopropylbenzene | Trimesic. |
| 1,3-dimethyl-5-ethylbenzene | Trimesic. |
| 1-methylnaphthalene | α-Naphthoic acid. |
| 2-methylnaphthalene | β-Naphthoic acid. |

In all cases the oxidation is preferably effected in the presence of known oxidation catalysts and also in the presence of a bromine-affording substance; this type of oxidation not only results in minimizing degradation and by-product formation but it enables the use of air or other oxidizing gas as the oxidizing medium and hence minimizes the presence in the final products of certain of the impurities which are usually present in oxidation processes produced by other techniques. The temperatures, pressures, contact times and so forth will, of course, be dependent upon the particular charging stock employed and the nature and purity of the desired acid product. A specific example of my invention has been described in considerable detail and various alternative arrangements, steps and conditions will be apparent from said description to those skilled in the art.

I claim:
1. The method of oxidizing a polyalkyl aromatic hydrocarbon in the liquid phase to an aromatic polycarboxylic acid, which method comprises introducing such hydrocarbon into a first oxidizing zone and therein contacting it with gas containing molecular oxygen and an oxidation catalyst at a temperature in the range of about 300 to 400° F. under a pressure of the order of 50 to 400 p.s.i., pumping liquid from the first oxidation zone to a second oxidation zone and also pumping to the second oxidation zone at least an equal volume of substantially anhydrous aliphatic carboxylic acid containing 2 to 6 carbon atoms as solvent, effecting oxidation in the second zone in the presence of an oxidation catalyst comprising bromine promoted multi-valent heavy metal in an amount of from 0.01 to 10 percent based on said aromatic hydrocarbon wherein the ratio of bromine promoter is in the ratio of 0.1 to 10 atoms of said heavy metal per atom of bromine at a temperature in the range of 320 to 440° F. at higher pressure in the range of 100 to 500 p.s.i. by introducing a controlled amount of oxygen-containing gas at the base of the second zone, removing solvent in the form of vapors from the second oxidation zone and returning said removed solvent to said first oxidation zone in an amount at least equal to that of polyalkyl aromatic hydrocarbon introduced thereto, condensing solvent vapors leaving the first oxidation zone and returning to said first zone at least a part of condensed vapors.

2. The method of claim 1 which includes the step of flashing liquid from the first oxidation zone before it is pumped to the second oxidation zone to separate unoxidized hydrocarbons in vapor form and returning said separated hydrocarbons to the first oxidation zone.

3. The method of countercurrently oxidizing a polyalkyl aromatic in the liquid phase to an aromatic polycarboxylic acid charging stock in a plurality of stages in the presence of a solvent and catalyst comprising bromine promoted multi-valent heavy metal in an amount of from 0.01 to 10 percent based on said aromatic hydrocarbon wherein the ratio of bromine promoter is in the ratio of 0.1 to 10 atoms of said heavy metal per atom of bromine, which method comprises adding substantially anhydrous acetic acid and air to the final stage, adding both oxidizing gas and recovered solvent from the final stage to an earlier stage, passing a charging stock to be oxidized to the earlier stage and passing partially oxidized charging stock from the earlier stage to the final stage.

4. The method of oxidizing p-xylene in the liquid phase with air to terephthalic acid in the presence of acetic acid which method comprises introducing into the first of two oxidation zones a mixture consisting essentially of acetic acid, para-xylene and an oxidation catalyst comprising bromine promoted multivalent heavy metal in an amount of from 0.01 to 10% based on para-xylene wherein the ratio of bromine to heavy metal is in the ratio of 0.1 to 10 atoms of said heavy metal per atom of bromine wherein said mixture there is on a volume basis a ratio of acetic acid to para-xylene of from 1:1 to 5:1, contacting para-xylene in said first oxidation zone with air at a pressure in the range of from 50 to 400 p.s.i. and at a temperature in the range of from 300 to 400° F., flashing liquids from the first oxidation zone to separate unoxidized para-xylene in vapor form, returning said unoxidized paraxylene to the first oxidation zone, pumping liquid from said flashing step to the second oxidation zone and also pumping to the second oxidation zone at least an equal volume of anhydrous acetic acid, contacting the mixture in the second oxidation zone with air at a pressure in the range of 100 to 500 p.s.i. and at a temperature in the range of 320 to 440° F., removing acetic acid vapors from the second oxidation zone and adding at least a portion of said acetic acid vapors in the first oxidation zone, condensing acetic acid vapors leaving the first oxidation zone and returning to the first oxidation zone at least a part of the condensed acetic acid.

References Cited in the file of this patent

UNITED STATES PATENTS

| | | |
|---|---|---|
| 2,245,528 | Loder | June 10, 1941 |
| 2,552,267 | Emerson et al. | May 8, 1951 |
| 2,746,990 | Fortuin et al. | May 22, 1956 |
| 2,833,816 | Saffer et al. | May 6, 1958 |

FOREIGN PATENTS

| | | |
|---|---|---|
| 666,709 | Great Britain | Feb. 20, 1952 |

UNITED STATES PATENT OFFICE
CERTIFICATE OF CORRECTION

Patent No. 3,064,044                      November 13, 1962

Richard H. Baldwin

It is hereby certified that error appears in the above numbered patent requiring correction and that the said Letters Patent should read as corrected below.

Column 2, line 40, for "or" read -- of --; column 3, line 17, for "terphthalic" read -- terephthalic --; column 4, in the table, line 2 thereof, for "dimiethylbenzene" read -- dimethylbenzene --; same table, second column, line 9 thereof, for "Pyromelliltic" read -- Pyromellitic --; column 5, line 12, after "aromatic", first occurrence, insert -- charging stock --; line 13, after "acid" strike out -- charging stock --.

Signed and sealed this 7th day of May 1963.

(SEAL)
Attest:

ERNEST W. SWIDER
Attesting Officer

DAVID L. LADD
Commissioner of Patents